United States Patent
Frustaci et al.

(10) Patent No.: US 7,482,093 B1
(45) Date of Patent: *Jan. 27, 2009

(54) INSULATOR DESIGN TO PREVENT LITHIUM CLUSTER BRIDGING

(75) Inventors: Dominick Frustaci, Williamsville, NY (US); Gary Freitag, East Aurora, NY (US)

(73) Assignee: Greatbatch Ltd., Clarence, NY (US)

( * ) Notice: Subject to any disclaimer, the term of this patent is extended or adjusted under 35 U.S.C. 154(b) by 851 days.

This patent is subject to a terminal disclaimer.

(21) Appl. No.: 11/007,974

(22) Filed: Dec. 9, 2004

Related U.S. Application Data

(60) Provisional application No. 60/528,258, filed on Dec. 9, 2003.

(51) Int. Cl.
- H01M 2/14 (2006.01)
- H01M 2/00 (2006.01)
- H01M 6/00 (2006.01)

(52) U.S. Cl. .............. 429/131; 429/129; 429/163; 29/623.1

(58) Field of Classification Search .............. None
See application file for complete search history.

(56) References Cited

U.S. PATENT DOCUMENTS

| | | | |
|---|---|---|---|
| 4,048,399 A | 9/1977 | Terzaghi | |
| 4,061,841 A * | 12/1977 | Sharma et al. | 429/112 |
| 4,830,940 A | 5/1989 | Keister et al. | |
| 4,964,877 A | 10/1990 | Keister et al. | |
| 5,134,045 A | 7/1992 | Lanari | |
| 5,147,737 A | 9/1992 | Post et al. | |
| 5,250,373 A | 10/1993 | Muffoletto et al. | |
| 5,312,458 A * | 5/1994 | Muffoletto et al. | 29/623.1 |
| 5,716,735 A | 2/1998 | Muffoletto et al. | |
| 5,744,261 A * | 4/1998 | Muffoletto et al. | 429/131 |
| 5,811,206 A * | 9/1998 | Sunderland et al. | 429/181 |
| 6,087,036 A * | 7/2000 | Rouillard et al. | 429/66 |
| 6,245,456 B1 | 6/2001 | Fukuda et al. | |
| 6,524,742 B1 | 2/2003 | Emanuel et al. | |
| 6,933,074 B2 * | 8/2005 | Frustaci et al. | 429/131 |
| 2003/0017385 A1 * | 1/2003 | Frustaci et al. | 429/129 |

FOREIGN PATENT DOCUMENTS

| | | |
|---|---|---|
| WO | WO 2004/086538 A2 | 3/2004 |
| WO | WO 2004/086538 A3 | 3/2004 |

OTHER PUBLICATIONS

"EFTE." Wikipedia. 2008. Wikimedia Foundation, Inc. Jun. 5, 2008 <http://en.wikipedia.org/wiki/ETFE>.*
"DuPont™ Tefzel® ETFE" on http://www2.dupont.com/Teflon_Industrial/en_US/tech_info/prodinfo_etfe.html. Accessed on: Oct. 23, 3008.*
Lithium Deposition in Prismatic Lithium Cells During Intermittent Discharge—Esther S. Takeuchi and William C. Thiebolt III, Journal of the Electrochemical Society, vol. 138, No. 9, Sep. 1991.

* cited by examiner

Primary Examiner—Dah-Wei D Yuan
Assistant Examiner—Edu E Enin-Okut
(74) Attorney, Agent, or Firm—Michael F. Scalise

(57) ABSTRACT

An insulator structure forming a physical barrier encapsulating the entire electrode assembly including all the positive portions and segregating them from the negative leads and the casing is described. By completely encapsulating the electrode assembly including the cathode lead portions from the anode leads and the casing, no opposite polarity structures that can potentially serve as a surface for lithium bridging are left exposed to electrolyte.

23 Claims, 9 Drawing Sheets

INSULATOR DESIGN TO PREVENT LITHIUM CLUSTER BRIDGING

CROSS-REFERENCE TO RELATED APPLICATION

This application claims priority from provisional application Ser. No. 60/528,258, filed Dec. 9, 2003.

BACKGROUND OF THE INVENTION

1. Field of the Invention

The present invention generally relates to the conversion of chemical energy to electrical energy. More particularly, this invention is directed to the use of an insulator structure forming a physical barrier isolating the entire electrode assembly including all the positive electrode portions from the negative terminal comprising the anode leads and the casing in a primary lithium electrochemical cell. This degree of isolation is necessary to prevent lithium clusters from bridging between the positive and negative portions of the cell. Lithium clusters are the result of a higher $Li^+$ ion concentration in the electrolyte immediately adjacent to a surface, creating an anodically polarized region and resulting in the reduction of lithium ions onto the surface as the concentration gradient relaxes. Typically, a lithium ion concentration gradient is induced by a high rate intermittent discharge of a lithium/silver vanadium oxide (Li/SVO) cell. Should lithium cluster bridging occur, it could result in an internal loading mechanism that prematurely discharges the cell.

2. Prior Art

The mechanism controlling lithium deposition on the anode lead and casing of a case negative primary lithium electrochemical call is described in the publication by Takeuchi, E. S.; Thiebolt, W. C. *J. Electrochem. Soc.* 138, L44-L45 (1991). While this report specifically discusses measurements made on the Li/SVO system, it is noted that they also apply to other solid insertion type cathodes used in lithium cells where voltage decreases with discharge.

According to the investigators, lithium deposition is induced by high rate intermittent discharge of a lithium/silver vanadium oxide cell and can form "clusters" bridging between the negative case and the positive connection to the cathode. This conductive bridge can then result in an internal loading mechanism that prematurely discharges the cell.

The mechanism for lithium cluster formation is as follows: at equilibrium, the potential of a lithium anode is governed by the concentration of lithium ions in the electrolyte according to the Nernst equation. If the $Li^+$ ion concentration is increased over a limited portion of the electrode surface, then the electrode/electrolyte interface in this region is polarized anodically with respect to the electrode/electrolyte interface over the remaining portion of the electrode. Lithium ions will be reduced in this region of higher concentration and lithium metal will be oxidized over the remaining portion of the electrode until the concentration gradient is relaxed. The concentration gradient may also be relaxed by diffusion of lithium ions from the region of high concentration to low concentration. However, as long as a concentration gradient exists, deposition of lithium is thermodynamically favored in the region of high lithium ion concentration.

In Li/SVO batteries, $Li^+$ ions are discharged at the anode and subsequently intercalated into the cathode. The anode and cathode are placed in close proximity across a thin separator. Immediately after a pulse discharge, the $Li^+$ ion concentration gradient in the separator is dissipated as the $Li^+$ ions diffuse the short distance from the anode to the cathode and then within the pore structure of the cathode. However, at the electrode assembly edge, the anode edge is not directly opposed by the cathode edge. If excess electrolyte pools at this edge, $Li^+$ ions, which are discharged into the electrolyte pool, have a longer distance to diffuse to the cathode than $Li^+$ ions discharged into the separator. Consequently, this electrolyte pool maintains a higher concentration of $Li^+$ ions for a longer period of time after the pulse discharge.

Typically, the lithium anode tab is welded to the inside of the battery casing. Therefore, if these components are also wetted by excess electrolyte, this concentration gradient extends over the tab and casing, and lithium cluster deposition is induced onto these surfaces by the Nernstian anodic potential shift derived from the higher $Li^+$ ion concentration in the excess electrolyte pool after the pulse discharge.

SUMMARY OF THE INVENTION

The present invention is, therefore, directed to the use of an insulator structure forming a physical barrier encapsulating the entire electrode assembly including all the positive portions and segregating them from the negative leads and the casing. The positive cell portions include: 1) the terminal pin electrically isolated from the negative portions and the casing by a non-conductive material such as glass or ceramic; 2) the cathode bridge assembly electrically connecting the cathode plates to the terminal pin; and 3) the cathode plates themselves isolated from the anode electrode by separator material. The negative cell portions include: 1) the casing; 2) the anode tabs that connect the anode electrode to the casing; and 3) the anode electrode.

By encapsulating the electrode assembly including the cathode lead portions from the anode leads and the casing, electrolyte flow between opposite polarity structures that can potentially serve as surfaces for lithium bridging is greatly inhibited. Furthermore, what electrolyte flow that remains is not sufficient to establish conditions favorable for the formation of bridging lithium clusters. That is, no opposite polarity surfaces are left exposed that could potentially serve as an anodically polarized region in the cell favorable for the reduction of lithium ions from the electrolyte as the concentration gradient in the electrolyte relaxes.

These and other aspects of the present invention will become more apparent to those skilled in the art by reference to the following description and to the appended drawings.

DETAILED DESCRIPTION OF THE PREFERRED EMBODIMENTS

Figure 1:
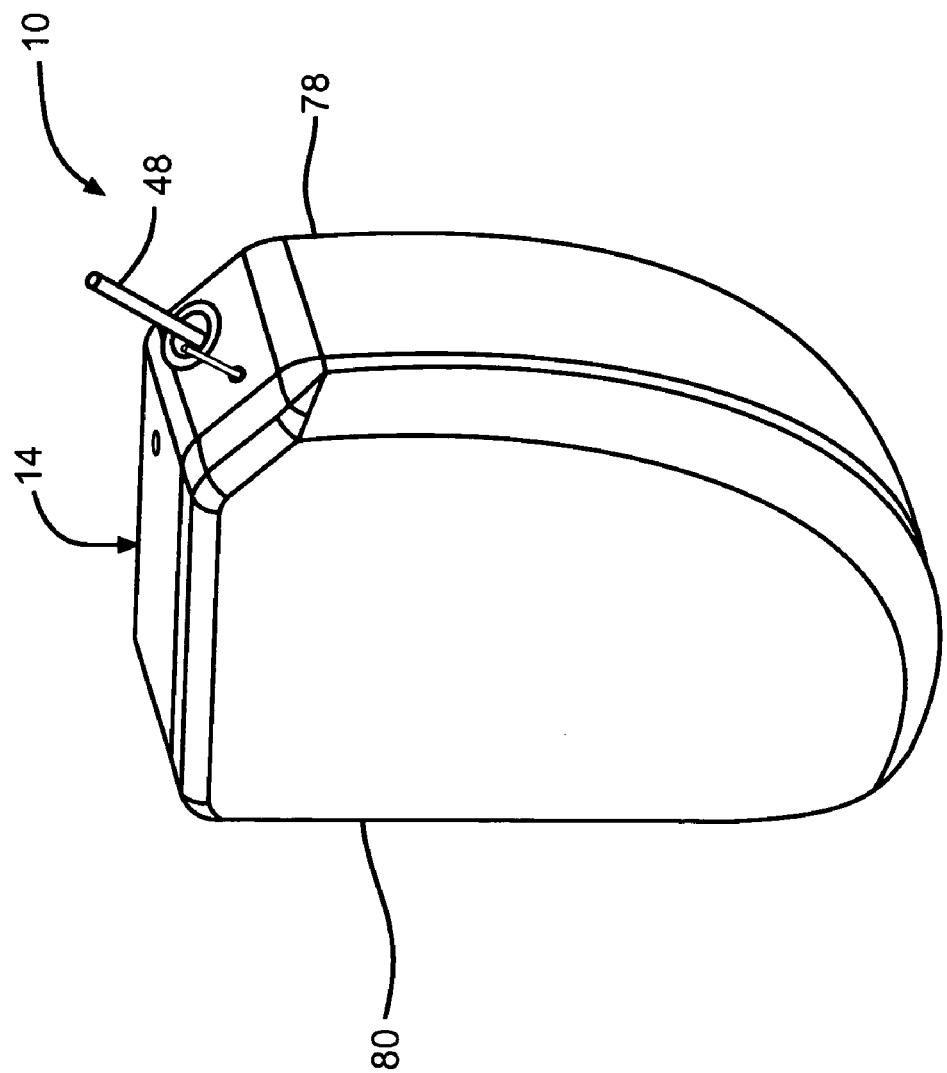
FIG. 1 is a perspective view of an electrochemical cell 10 according to the present invention.

Referring now to the drawings, FIG. 1 illustrates an electrochemical cell 10 according to the present invention comprising an electrode assembly 12 (FIGS. 4 and 5) housed in a casing 14. The electrode assembly 12 comprises an elongate anode provided in a serpentine configuration with cathode plates interleaved between the anode folds. Both the anode and the cathode plates have similar shapes so that in the electrode assembly, their peripheral edges generally coincide with each other.

The anode is a comparatively elongate member and comprises a continuous ribbon-like anode current collector in the form of a thin metal mesh or screen, for example, nickel, which may be from 10% to 80% open, for collecting the generated current. More particularly, the anode current collector comprises eight plate-shaped portions 16, 18, 20, 22, 24, 26, 28 and 30. Connector portions extend to immediately adjacent anode plate portions to provide the anode current collector as a unitary member. Only connector portions 32, 34, 36 and 38 are shown in the drawings. Connector portion 32 joins anode plate portions 16 and 18, connector portion 34 joins anode plate portions 20 and 22, connector portion 36 joins anode plate portions 24 and 26 and connector portion 38 joins anode plate portions 28 and 30. While not shown in the drawings of FIGS. 4 and 5, it is understood that similarly shaped connector portions joining plates 18 and 20, 22 and 24, and 26 and 28 reside on the opposite side of the electrode assembly.

Before the anode current collector is folded into the serpentine-like shape shown, anode active material, preferably comprising lithium, is contacted to the opposite major faces of the anode plate portions 18, 20, 22, 24, 26 and 28 of the anode current collector. The outermost anode plate portions 16 and 30, however, only have lithium contacting their inner major faces. This is because the opposite major faces do not face a cathode plate so anode active material is not required there. The connector portions are completely devoid of anode active material. The outermost anode plate portions 16 and 30 are further provided with downwardly extending tabs 16A and 30A, respectively. The significance of them will be described in detail hereinafter. The anode, including the plates having lithium contacted thereto and the connector portions, is then enveloped in a separator before being folded into the serpentine shape.

After the anode is folded into its final serpentine configuration, individual cathode plates are interleaved between the folds. The cathode plates are each comprised of a cathode current collector in the form of a thin metal mesh or screen, for example, titanium or stainless steel, which may be from 10% to 80% open, for collecting the generated current. There are seven cathode plates interleaved between the folds formed by the continuous anode. While it is difficult to see in the drawings, there is a first cathode plate between anode plates 16 and 18, a second cathode plate between anode plates 18 and 20, a third cathode plate between anode plates 20 and 22, a fourth cathode plate between anode plates 22 and 24, a fifth cathode plate between anode plates 24 and 26, a sixth cathode plate between anode plates 26 and 28, and a seventh cathode plate between anode plates 28 and 30. The cathode plates are each provided with separator material that envelops them. That way, a double layer of separator, i.e. one layer enveloping the anode and one layer enveloping the cathode, prevents direct contact between the anode and the immediately adjacent cathode plates.

Figure 5:
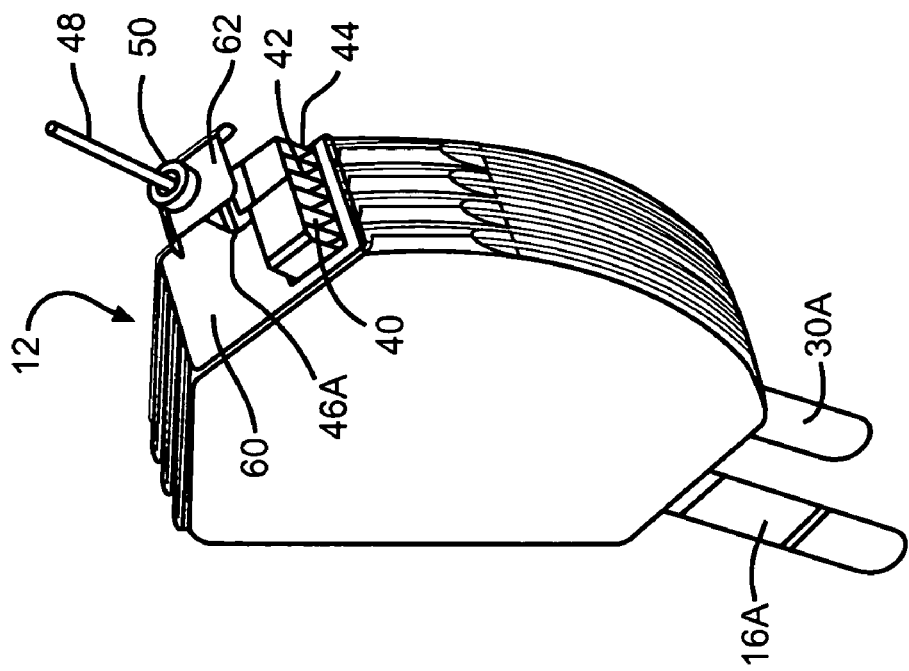
FIG. 5 is a perspective view of the electrode assembly shown in FIG. 4 with the cathode manifold tab 46 bent into its final position.
Figure 4:
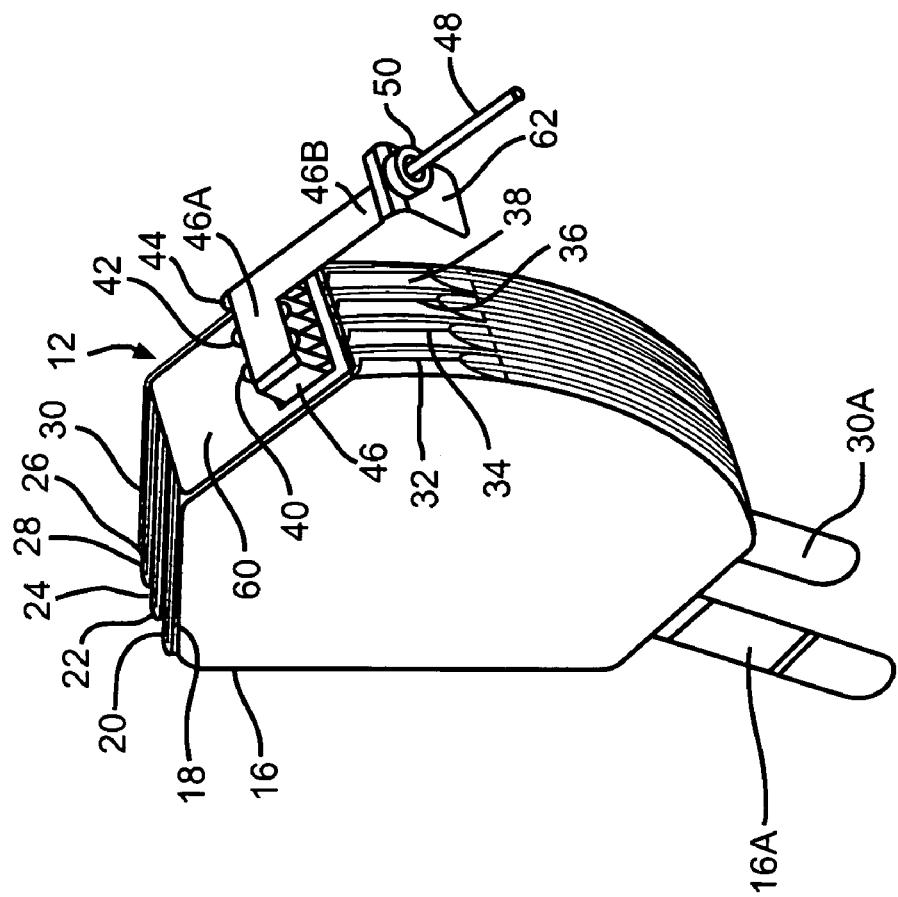
FIG. 4 is a perspective view of the electrode assembly 12 with connectors 40, 42 and 44 bridging to cathode plate pairs contacting a cathode manifold tab 46.
Figure 6:
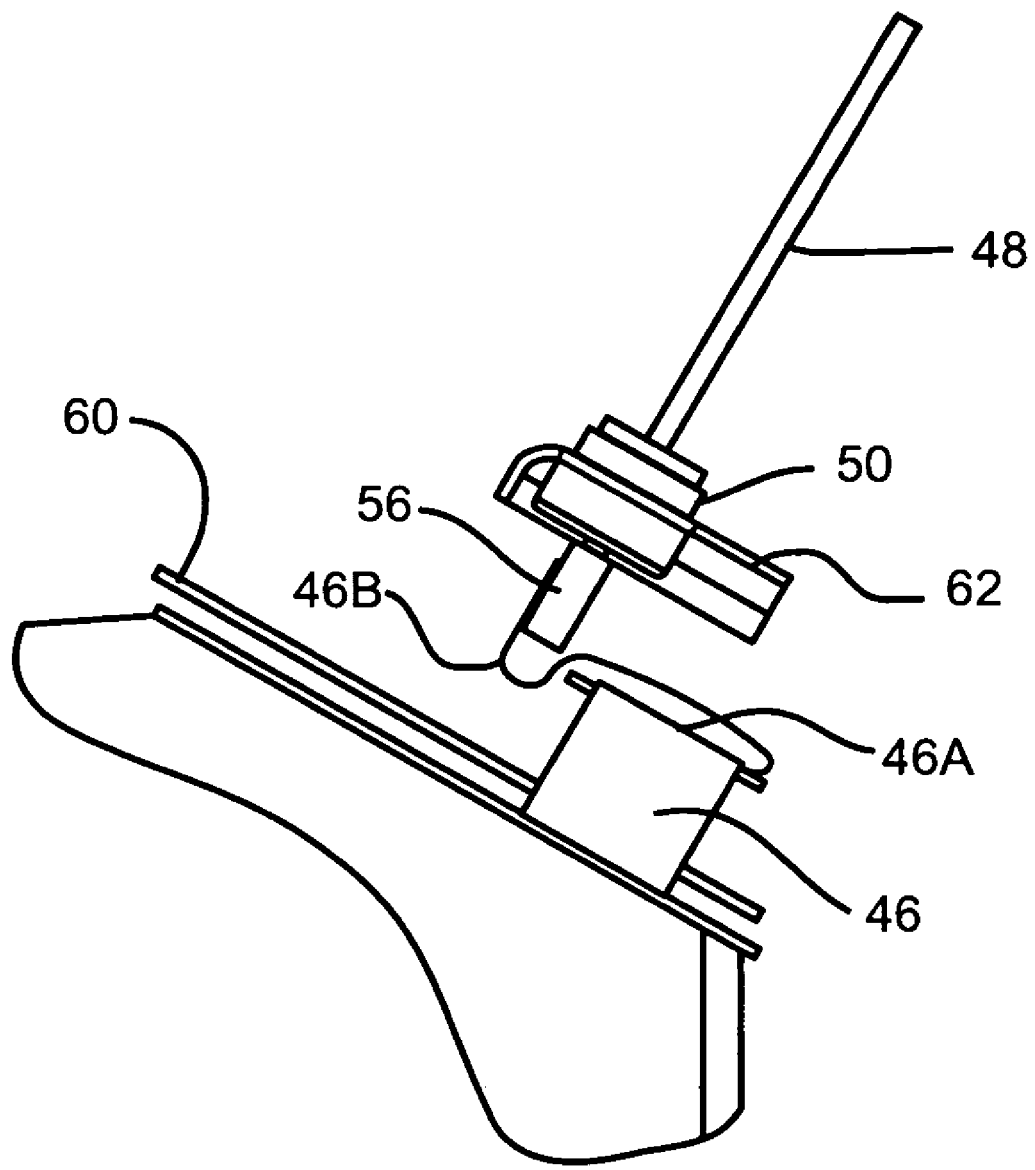
FIG. 6 is a side elevational view of the cathode manifold tab 46 shown in FIG. 5.

Six of the cathode plates are provided as plate pairs comprising a connector joining them together in a butterfly configuration. In FIGS. 4 and 5, three inverted U-shaped connectors 40, 42 and 44 are shown bridging to cathode plate pairs interleaved between folds of the serpentine anode. The seventh cathode plate is provided with a manifold tab 46 having a generally L-shape in plan view. This cathode plate is interleaved between the first and second anode plate portions 16 and 18. The manifold tab 46 is then bent down to place its short leg 46A in physical contact with the apex of the upstanding cathode connectors 40, 42 and 44 joining together the cathode plate pairs. As shown in FIGS. 5 and 6, a long leg 46B of tab 46 is then folded back upon itself with its distal portion extending upwardly. For a more detailed description of an electrochemical cell containing a butterfly electrode assembly, reference is made to U.S. Pat. No. 5,250,373 to Muffoletto et al., which is assigned to the assignee of the present invention and incorporated herein by reference.

Figure 3:
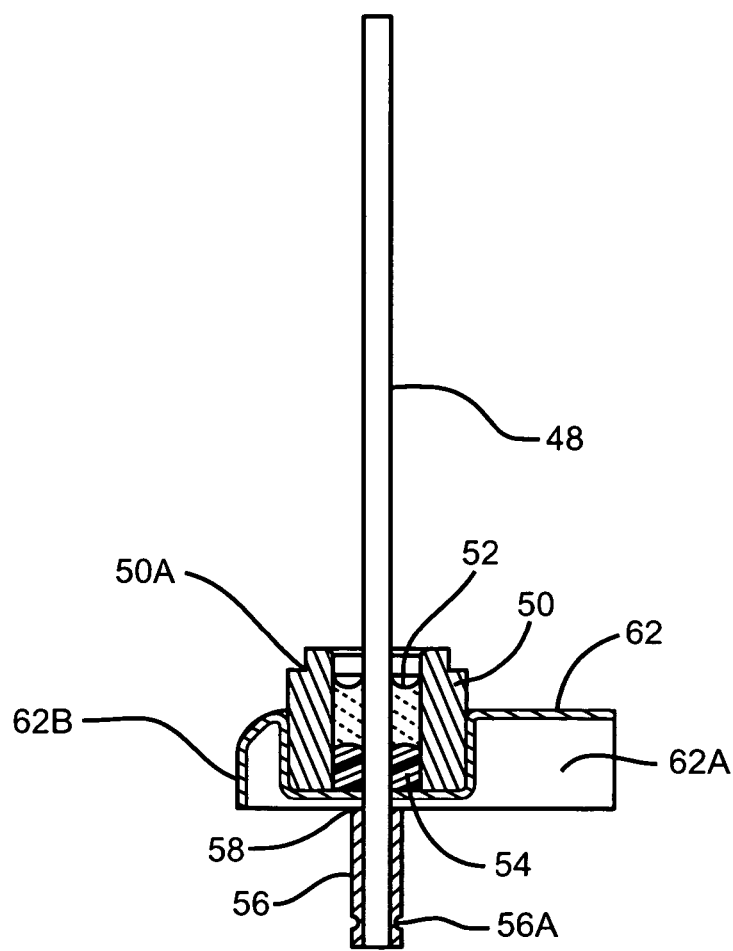
FIG. 3 is a cross-sectional view taken along line 3-3 of FIG. 2.

FIG. 3 shows a cathode terminal pin 48 sub-assembly. The terminal pin 48 passes through an inner opening in a cylindrically shaped ferrule 50, such as of titanium, supported therein in an electrically insulated relationship by a sealing glass material 52. A polymeric material 54 is filled into the bottom of the ferrule 50 to help prevent electrolyte from contacting the sealing glass 52.

The terminal pin 48 is preferably comprised of molybdenum, which is a relatively difficult material to weld. For that reason, a titanium sleeve 56 is fitted on the proximal end of the pin 48. A crimp 56A maintains the sleeve 56 in position with its upper end spaced somewhat below the lower end of the ferrule 50. This provides a gap 58 for an insulator to reside between the ferrule 50 and the titanium sleeve 56, as will be described in greater detail hereinafter.

Referring back to FIGS. 4 to 6, the distal portion of the manifold tab leg 46B is secured to the sleeve 56, such as by welding, brazing, soldering, and the like, to electrically connect the terminal pin 48 to the cathode plates through the manifold tab 46 and cathode connecting portions 40, 42 and 44. A planar, polymeric insulator 60 rests against the upper edges of the anode and cathode plates. The insulator 60 has an opening sized to fit around the upstanding cathode connecting portions.

Figure 2:
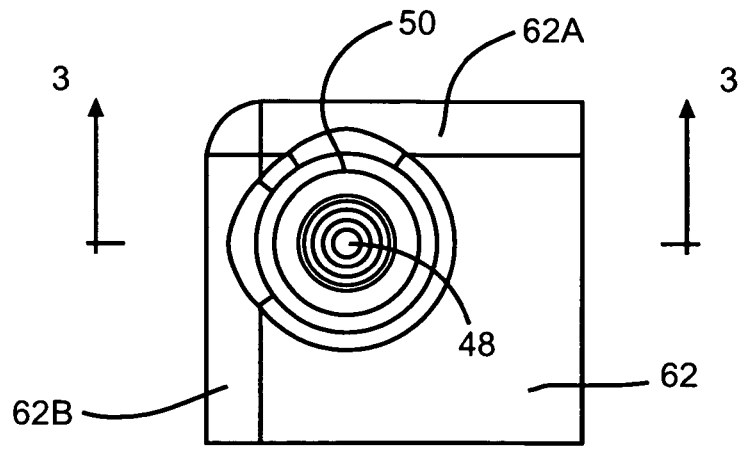
FIG. 2 is a plan view of the electrochemical cell 10.

A second polymeric insulator shield 62 surrounds the ferrule 50. This insulator 62 is generally square in plan view with the plane of the shield being perpendicular to the longitudinal axis of the ferrule. The shield has downwardly curved contiguous edges 62A and 62B (FIGS. 2 and 3). The significance of the insulators 60 and 62 will be described in detail hereinafter.

Figure 7:
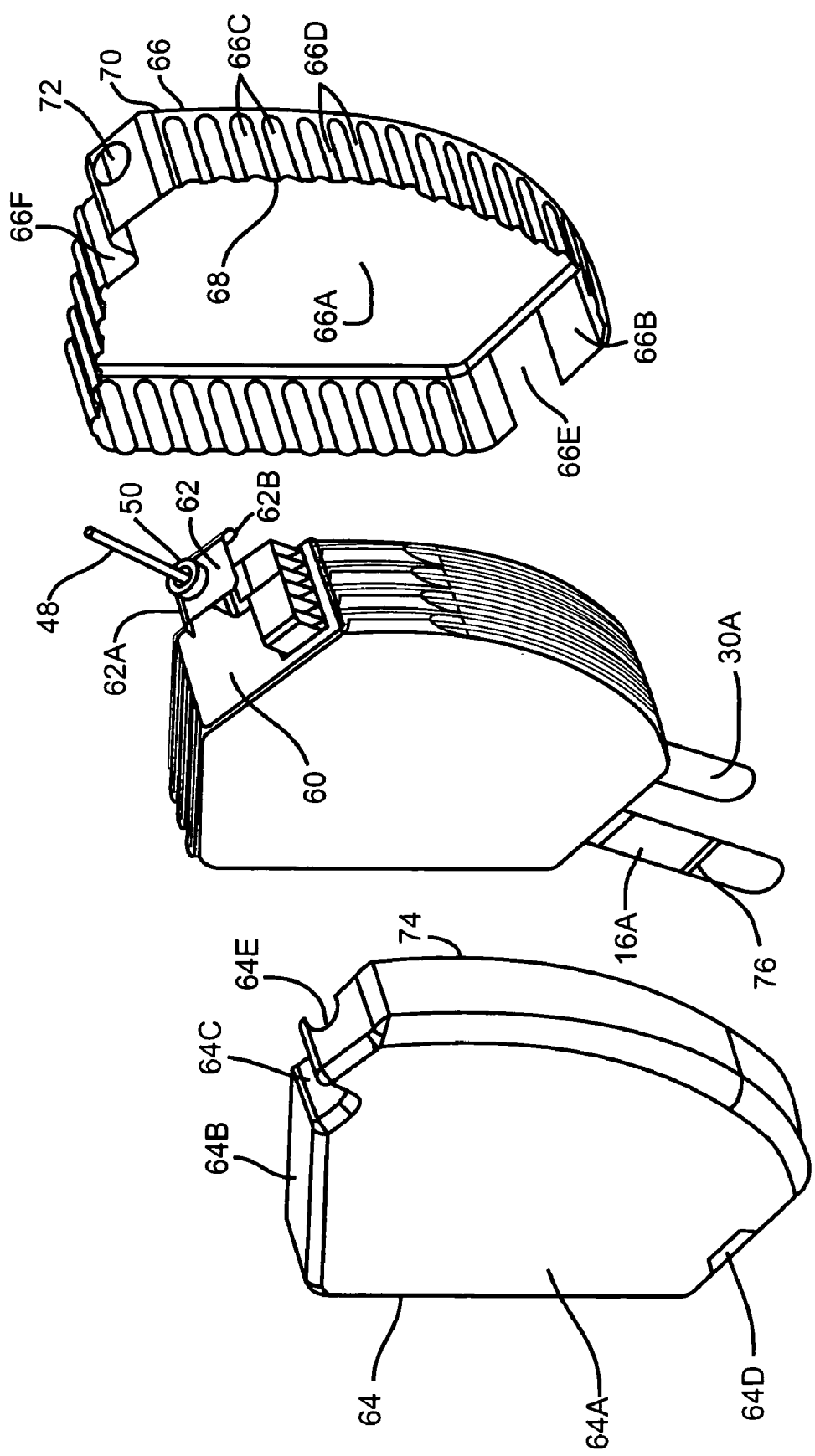
FIG. 7 is an exploded view of the left and right insulator portions 64 and 66 prior to being fitted together to enclose the electrode assembly 12.
Figure 8:
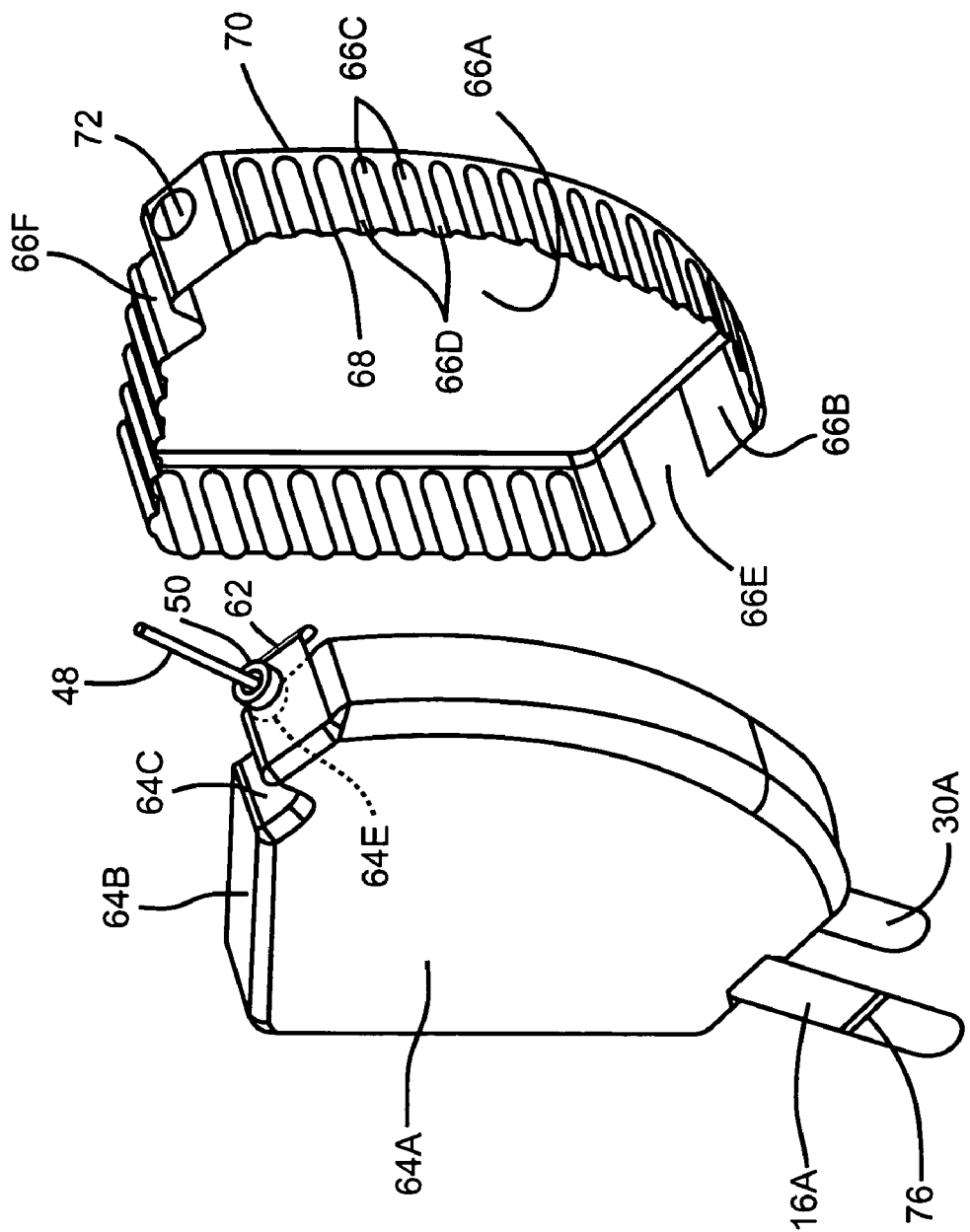
FIG. 8 is a partially exploded view of the electrode assembly 12 of FIG. 7 with the left insulator 64 mounted thereon, but not the right insulator 66.
Figure 9:
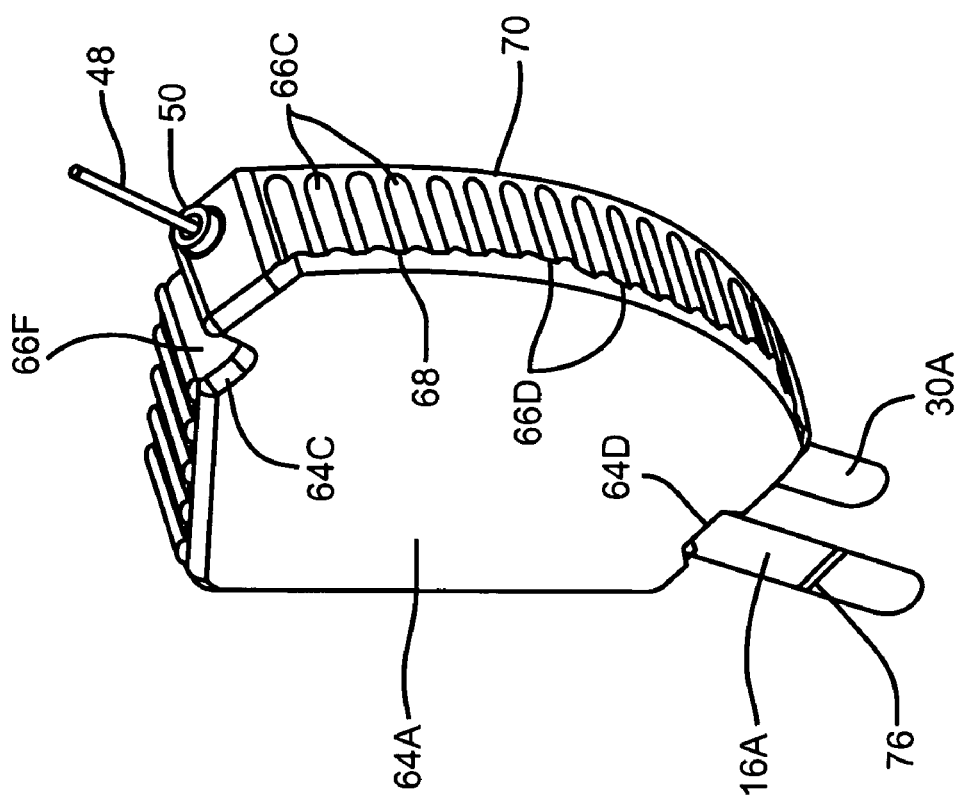
FIG. 9 is a perspective view showing the right insulator 66 mounted on the left insulator 64 to thereby enclose the electrode assembly 12.

As shown in FIGS. 7 to 9, the thusly-constructed electrode assembly 12 including the cathode connectors is encased or housed inside a polymeric insulator. The insulator comprises a left insulator portion 64 sized to fit inside a right insulator portion 66. The left insulator 64 comprises a left face wall 64A supporting a surrounding sidewall 64B having a curved depression 64C diametrically opposite a slit 64D. A curved recess 64E is provided in the sidewall 64B adjacent to the inlet 64C.

The right insulator 66 comprises a right face wall 66A supporting surrounding sidewall 66B provided with a plurality of raised ribs 66C spaced about the periphery thereof by intermediate lands 66D. The raised ribs 66C extend from the sidewall edge 68 nearly to an inner edge 70 thereof and comprise a rounded crest spaced above the lands 66D. An opening 72 is provided in the sidewall 66B diametrically opposite a squared-off inlet 66E. A curved depression 66F is provided in the sidewall adjacent to the opening 72. This depression 66F aligns with the depression 64C of the left insulator when the insulators are mated together. These depressions 64C and 66F allow for the free and unhindered flow of electrolyte into the cell, as will be described in detail hereinafter.

The surrounding sidewall 64B of the left insulator 64 is sized somewhat smaller than the surrounding sidewall 66B of the right insulator 66. That way, the electrode assembly is nested inside the left insulator by tilting the electrode assembly so the left anode tab 16A extends through the slit 64D. The electrode assembly is then tilted in the opposite direction to position the inlet 64E of the left insulator 64 in the gap 58 between the polymeric insulator shield 62 and the terminal pin sleeve 56, partially surrounding the ferrule 50. In this position, the downwardly curved back edge 62A of shield 62 is partially received in curved inlet 64C of the left insulator 64 with the downwardly curved right edge 62B covering an edge 74 of the insulator 64 adjacent to the curved recess 64E.

The right insulator 66 is then mated to the left insulator 64 by tilting the electrode assembly 12 so that the ferrule 50 is first received in the opening 72 of the right insulator 66. The shield 62 now resides between the left insulator 64 and the right insulator. Alternatively, the shield 62 could reside under the left insulator 64. The right insulator 66 is then moved so that its face wall 66A is generally parallel to the plane of anode plate 30. This causes both anode tabs 16A and 30A to be received in the squared-off inlet 66E with the edge of the left sidewall 64B of insulator 64 fitted inside the right sidewall 66B and abutting the inner edge 70 of the right insulator 66. Also, in this position the downwardly curved edge 62B of shield 62 provides clearance for this overlapped relationship between the insulators 64, 66.

Both the left and right insulators 64 and 66 are of a non-porous polymeric material such as polyethylene, polypropylene, ETFE, PTFE, or polyethylenechlorotrifluoroethylene. These materials are substantially impervious to lithium ion flow there through.

Figure 10:
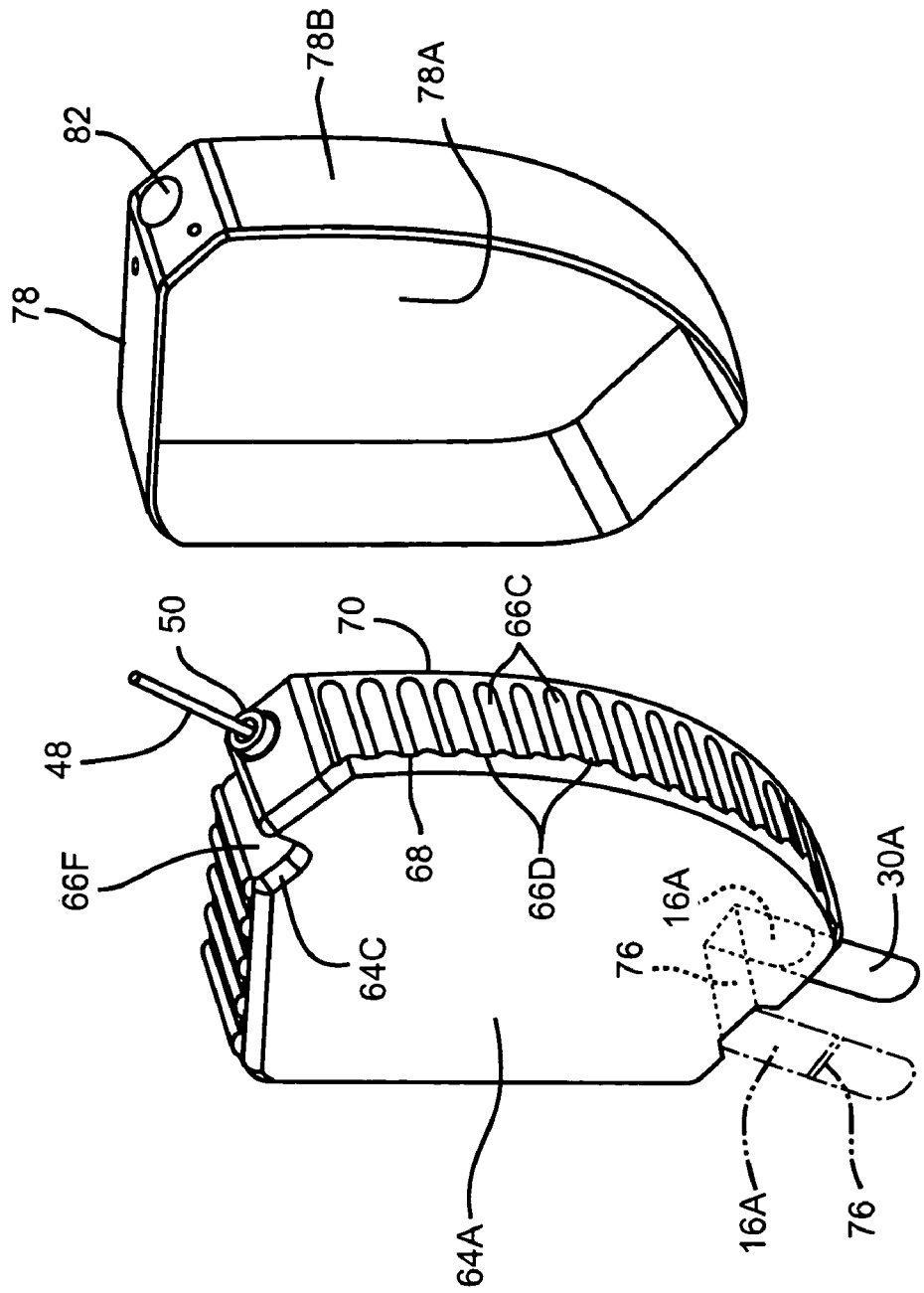
FIG. 10 is an exploded view showing a right casing portion 78 before it receives the electrode assembly of FIG. 9 housed in the mated insulators 64, 66.

As shown in FIG. 10, the left anode tab 16A is next folded toward the right anode tab 30A and down onto the surrounding sidewall 64B of the left insulator 64. A crease line 76 indicates the extent of the distal portion of the left tab 16A overlapping the right tab 30A. Then, the right tab 30A and the distal portion of the left tab 16A are folded back to the left with a distal portion of the right tab extending outwardly, normal to the plane of the left face wall 64A of the left insulator 64 (FIG. 11).

The insulated electrode assembly is then hermetically housed inside the casing 14 comprising right and left mating clamshell portions 78 and 80, respectively. The casing portions are of stainless steel, mild steel, or titanium, with the latter being preferred.

Figure 11:
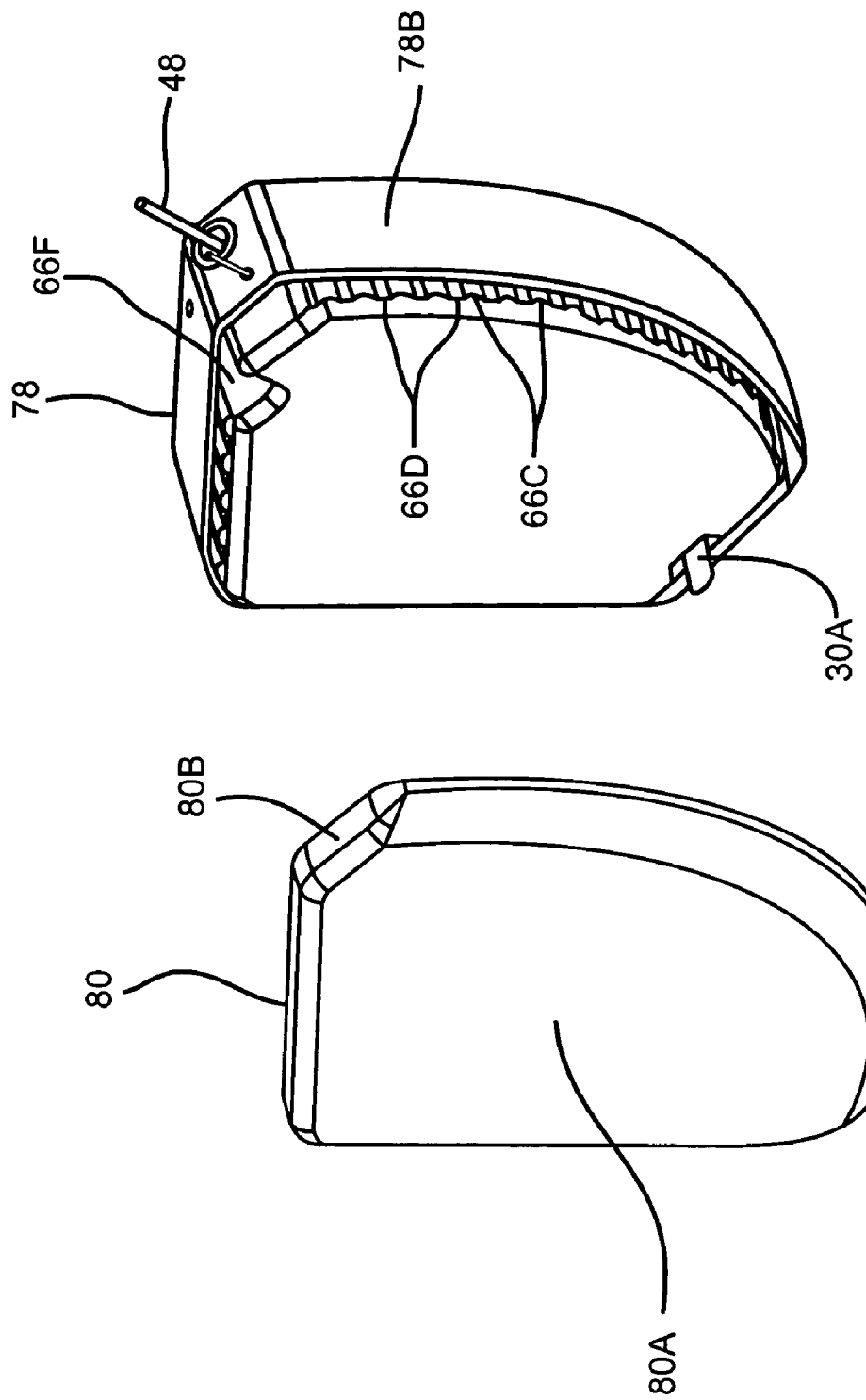
FIG. 11 is an exploded view showing a left casing portion 80 before it is mated with the right casing portion 78 having the electrode assembly of FIG. 10 nested therein.

As shown in FIGS. 10 and 11, the right casing portion 78 comprises a right face wall 78A supporting a surrounding sidewall 78B. The electrode assembly 12 housed in the mated insulators 64 and 66 is nested in the right casing portion 78 with an annular step 50A of the ferrule 50 (FIG. 3) received in an opening 82 in the sidewall 78B. The depth of the step 50A is similar to the thickness of the sidewall 78B so that the upper surface of the ferrule 50 is substantially coplanar with the upper surface of the casing sidewall 78B.

The left clamshell portion 80 of the casing 14 comprises a left face wall 80A supporting a surrounding sidewall 80B. The left casing portion 80 is sized somewhat larger than the right casing portion 78 so that when they are mated to each other, the left sidewall 80B overlaps the right sidewall 78B. Before this, welding, and the like, secures the right anode tab 30A to the right casing sidewall 78B. Then, with the left casing sidewall 80B in an overlapping relationship with the right casing sidewall 78B, the right and left clamshell casing portions are welded to each other to provide the casing 14 as a hermetic closure.

In this position, the crests of the raised ribs 66C of the right insulator 66 contact the butt seam between the right and left casing portions 78, 80 with the intermediate lands 66D contacting the left insulator 64. The crests provide air pockets between the insulators 64, 66 at each raised rib 66C that help prevent heat generated during welding the seam from reaching the anode and cathode including their separators. Particularly, if the internal heat becomes too great, it may cause the lithium anode to react in a violent explosion. Also, too much internal heat can damage the separators. In that respect, the air pockets provide convection pathways that transfer comparatively less heat to the electrode assembly than conductive pathways.

The preferred anode active material is lithium and suitable cathode active materials are selected from silver vanadium oxide, copper silver vanadium oxide, manganese dioxide, cobalt oxide, nickel oxide, copper oxide, titanium disulfide, copper sulfide, iron sulfide, iron disulfide, copper vanadium oxide, carbon, fluorinated carbon, vanadium oxide, $LiCoO_2$, $LiNiO_2$, $LiMn_2O_4$, $Ag_2O$, $Ag_2O_2$, $CuF_2$, $Ag_2CrO_4$, and mixtures thereof.

The electrochemical cell 10 further includes a nonaqueous, ionically conductive electrolyte that serves as a medium for migration of ions between the anode and the cathode electrodes during electrochemical reactions of the cell. A suitable electrolyte has an inorganic, ionically conductive lithium salt dissolved in a mixture of aprotic organic solvents comprising a low viscosity solvent and a high permittivity solvent. The salt serves as the vehicle for migration of the anode ions to intercalate or react with the cathode active materials. Suitable salts include $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, $LiSCN$, $LiO_3SCF_3$, $LiC_6F_5SO_3$, $LiO_2CCF_3$, $LiSO_6F$, $LiB(C_6H_5)_4$, $LiCF_3SO_3$, and mixtures thereof.

Useful low viscosity solvents include esters, linear and cyclic ethers and dialkyl carbonates such as tetrahydrofuran, methyl acetate, diglyme, trigylme, tetraglyme, dimethyl carbonate, 1,2-dimethoxyethane, 1,2-diethoxyethane, 1-ethoxy, 2-methoxyethane, ethyl methyl carbonate, methyl propyl carbonate, ethyl propyl carbonate, diethyl carbonate, dipropyl carbonate, and mixtures thereof. Suitable high permittivity solvents include cyclic carbonates, cyclic esters, cyclic amides and a sulfoxide such as propylene carbonate, ethylene carbonate, butylene carbonate, acetonitrile, dimethyl sulfoxide, dimethyl formamide, dimethyl acetamide, γ-valerolactone, γ-butyrolactone, N-methyl-pyrrolidinone, and mixtures thereof. In the present invention, the preferred anode active material is lithium metal, the preferred cathode active material is SVO and the preferred electrolyte is 0.8M to 1.5M $LiAsF_6$ or $LiPF_6$ dissolved in a 50:50 mixture, by volume, of propylene carbonate and 1,2-dimethoxyethane.

In that respect, the present invention is broadly directed to electrochemical systems including lithium as an anode active material. The specific cathode active material is not limited, as long as it provides for the intercalation of lithium ions. In that case, the left insulator 64 fitted inside the right insulator 66 together with the shield 62 surrounding the ferrule 50 completely isolates the electrode assembly 12 from the casing 14 and the anode tabs 16A and 30A electrically connected to the casing.

This is not to say that there is no flow of electrolyte between negative and positive polarity cell portions. On the contrary, after the casing portions are sealed to each other, the activating electrolyte is filled into the casing and a close member fitted into the electrolyte fill opening in a known manner seals the casing. Inside the casing, the electrolyte flows to wet the anode electrode and the cathode electrode and to provide for ion flow between them during electrochemical reactions of the cell. The mating insulators 64, 66 together with the shield 62 do, however, ensure that no opposite polarity structures that can potentially serve as surfaces for lithium bridging are left exposed to electrolyte fluid flow sufficient to establish conditions favorable for the formation of bridging lithium clusters. That is, no opposite polarity surfaces are left exposed that could potentially serve as an anodically polarized region in the cell favorable for the reduction of lithium ions from the electrolyte as the concentration gradient in the electrolyte relaxes. That way, if a $Li^+$ ion concentration gradient should exist inside the casing, lithium is incapable of plating from a negative polarity anode plate or lead including the casing 14 to a positive polarity cathode plate including the connectors 40, 42, 44 and 46 and the internal portions of the terminal pin 48 below where it enters the ferrule 50. As previously described, the anode electrode including the connector portions 32, 34, 36 and 38 are enclosed in separator material with only the anode tabs 16A and 30A connected to the casing 14 extending out of this envelope. However, the anode tabs are isolated from the rest of the electrode assembly by the mated insulators 64 and 66.

It is also within the scope of the invention that the casing need not be of mating clamshell portions. Instead, the casing can be of a deep drawn design closed with a lid. The deep drawn design can have either a cylindrical shape for a jellyroll electrode assembly or be of a prismatic shape for a multiplate electrode assembly. Contemplated multiplate designs include those having a serpentine anode with interleaved cathode plates as previously described, a serpentine cathode with interleaved anode plates, or one having alternating anode and cathode plates.

For a cell housed in a prismatic casing, the electrode assembly enclosed in the mating insulators 64, 66 is housed in the deep drawn can and the anode tabs 16A and 30A are connected to the can adjacent to the open end. The cathode tab 46 is connected to the terminal pin 48 glassed into the ferrule 50 supported in the lid. The lid is then sealed to the can to complete the casing with the electrode assembly including all the positive portions segregating from the negative leads and the casing. An example of this type of casing is shown in the previously reference Muffoletto et al. patent.

Thus, the present insulator structure provides a reliable and easy to assemble barrier isolating the entire electrode assembly including all the positive electrode portions from the negative terminal comprising the anode leads and the casing in a primary lithium electrochemical cell. No opposite polarity structures that can potentially serve as surfaces for lithium bridging are left exposed to electrolyte fluid flow sufficient to establish conditions favorable for the formation of bridging lithium clusters. This makes the cell readily adapted for powering an implantable medical device, such as a cardiac defibrillator, without premature cell discharge caused by lithium bridging from any negative polarity portion to a positive polarity portion.

It is appreciated that various modifications to the inventive concepts described herein may be apparent to those of ordinary skill in the art without departing from the scope of the present invention as defined by the appended claims.

What is claimed is:

1. An electrochemical cell, which comprises:
   a) a casing comprising a first casing portion secured to a second casing portion to form an enclosure;
   b) an electrode assembly housed inside the casing and comprised of an anode comprising lithium and a cathode, wherein the anode comprises at least one anode lead electrically connected to the casing as its terminal and the cathode comprises at least one cathode lead electrically connected to a terminal lead insulated from the casing;
   c) an insulator comprising a first insulator portion partially housed inside a second, outer insulator portion to completely envelope the electrode assembly, wherein the second, outer insulator portion comprises a plurality of spaced apart raised ribs, each having a crest contacting an interior surface of the casing where the first casing portion is secured to the second casing portion with intermediate lands between the plurality of raised ribs contacting the first insulator portion opposite the location where the first casing portion is secured to the second casing portion; and
   d) an electrolyte provided in the casing to activate the electrode assembly.

2. The electrochemical cell of claim 1 wherein the insulator further surrounds the at least one cathode lead.

3. The electrochemical cell of claim 1 wherein the casing is of a deep drawn type closed by a lid or of a first and a second mating members.

4. The electrochemical cell of claim 1 wherein either the anode or the cathode is relatively elongated and provided in a serpentine shape with plates of the other of the anode and cathode interleaved between folds of the serpentine.

5. The electrochemical cell of claim 1 wherein the anode is relatively elongated and provided in a serpentine shape with at least two cathode plates interleaved and joined together in a butterfly configuration by a butterfly connector connected to the terminal lead.

6. The electrochemical cell of claim 5 wherein there are at least three cathode plates, two of which are interleaved and joined together in a butterfly configuration by the connector, the other having a manifold tab that contacts the butterfly connector and connects to the terminal lead.

7. The electrochemical cell of claim 1 wherein the electrode assembly comprises at least one anode plate and at least one cathode plate.

8. The electrochemical cell of claim 1 wherein the at least one cathode lead is supported in a ferrule by an electrically insulating material, the ferrule being electrically connected to the casing.

9. The electrochemical cell of claim 8 wherein a polymeric shield surrounds the ferrule where the first insulator is partially housed inside the second insulator.

10. The electrochemical cell of claim 1 wherein the at least one anode lead is diametrically opposite the electrode assembly from the cathode lead.

11. The electrochemical cell of claim 1 wherein the cathode is of a cathode active material selected from the group consisting of silver vanadium oxide, copper silver vanadium oxide, manganese dioxide, cobalt oxide, nickel oxide, copper oxide, titanium disulfide, copper sulfide, iron sulfide, iron disulfide, copper vanadium oxide, carbon, fluorinated carbon, vanadium oxide, $LiCoO_2$, $LiNiO_2$, $LiMn_2O_4$, $Ag_2O$, $Ag_2O_2$, $CuF_2$, $Ag_2CrO_4$, and mixtures thereof.

12. The electrochemical cell of claim 1 wherein the insulator is of a material that is substantially impervious to lithium ion flow there through and selected from the group consisting of polyethylene, polypropylene, ETFE, PTFE, and polyethylenechlorotrifluoroethylene.

13. The electrochemical cell of claim 1 wherein the terminal lead is of molybdenum.

14. The electrochemical cell of claim 13 wherein a proximal portion of the molybdenum terminal lead is provided with a titanium sleeve electrically connected to the at least one cathode lead.

15. An electrochemical cell, which comprises:
a) a casing comprising a first casing portion comprising a first major face wall joined to a first surrounding side wall and a second casing portion comprising a second major face wall joined to a second surrounding side wall, wherein the first and second casing members are matable to each other at their respective first and second surrounding side walls to form a seam;
b) an electrode assembly housed inside the casing and comprising an anode of lithium and a cathode, wherein the anode comprises at least one anode lead electrically connected to the casing as its terminal and the cathode comprises at least one cathode lead electrically connected to a terminal lead insulated from the casing;
c) an insulator comprising a first insulator portion partially housed inside a second, outer insulator portion to isolate the electrode assembly including the at least one cathode lead from the casing, wherein the second, outer insulator portion comprises a plurality of spaced apart raised ribs, each having a crest contacting an interior surface of the casing at the seam of the casing portions with intermediate lands between the plurality of raised ribs contacting the first insulator portion opposite the seam of the first casing portion mated to the second casing portion; and
d) an electrolyte provided in the casing to activate the electrode assembly.

16. A method for preventing the formation of lithium clusters in an electrochemical cell, comprising the steps of:
a) providing a casing comprising a first casing portion closable by a second casing portion;
b) providing an electrode assembly comprising an anode of lithium and a cathode, wherein the anode comprises at least one anode lead electrically connectable to the casing and the cathode comprises at least one cathode lead electrically connectable to a terminal lead insulated from the casing;
c) providing an insulator comprising a first insulator portion partially housed inside a second, outer insulator portion and completely enveloping the electrode assembly including the at least one cathode lead;
d) housing the electrode assembly enveloped inside the insulator in the first casing portion;
e) electrically connecting the at least one anode lead to the first casing portion as the anode terminal and electrically connecting the at least one cathode lead to the terminal lead insulated from the first casing portion;
f) closing the first casing portion with the second casing portion to provide the casing housing the electrode assembly, wherein the second, outer insulator portion comprises a plurality of spaced apart raised ribs, each having a crest contacting an interior surface of the casing where the first casing portion meets and closes the second casing portion with intermediate lands between the plurality of raised ribs contacting the first insulator portion opposite the meeting location of the first and second casing portions; and
g) activating the electrode assembly with an electrolyte provided in the casing.

17. The method of claim 16 including providing the casing being of a deep drawn type closed by a lid or of a first and a second mating members.

18. The method of claim 16 including providing either the anode or the cathode being relatively elongated and provided in a serpentine shape and further interleaving plates of the other of the anode and cathode between folds of the serpentine.

19. The method of claim 16 including providing the insulator of a polymeric material that is substantially impervious to lithium ion flow there through and selected from the group consisting of polyethylene, polypropylene, ETFE, PTFE, and polyethylenechlorotrifluoroethylene.

20. The method of claim 16 including providing the at least one anode lead being diametrically opposite the electrode assembly from the cathode lead.

21. The method of claim 16 including the insulator inhibiting fluid flow communication of the electrolyte between the electrode assembly and the at least one anode lead connected to the casing to an extent sufficient to prevent conditions favorable for the formation of lithium clusters between the electrode assembly and the at least one anode lead connected to the casing.

22. The electrochemical cell of claim 1 wherein the insulator inhibits fluid flow communication of the electrolyte between the electrode assembly and the at least one anode lead connected to the casing.

23. The electrochemical cell of claim 15 wherein the insulator inhibits fluid flow communication of the electrolyte between the electrode assembly and the at least one anode lead connected to the casing.

* * * * *